United States Patent [19]

Kiely et al.

[11] Patent Number: 4,624,645
[45] Date of Patent: Nov. 25, 1986

[54] RAPID DEPLOYMENT MOORING AND DISCHARGE SYSTEM AND METHOD

[75] Inventors: Willian L. Kiely, Cypress; Kristen I. Pedersen, Houston, both of Tex.

[73] Assignee: Sofec, Inc., Houston, Tex.

[21] Appl. No.: 749,140

[22] Filed: Jun. 27, 1985

Related U.S. Application Data

[63] Continuation of Ser. No. 578,586, Feb. 9, 1984, abandoned, which is a continuation-in-part of Ser. No. 503,638, Jun. 13, 1983, abandoned.

[51] Int. Cl.⁴ ............................................. B63B 21/52
[52] U.S. Cl. ........................................ 441/4; 114/230; 405/207
[58] Field of Search ............... 114/230, 264, 293, 294; 441/3–5, 28, 29; 405/158, 162, 171, 172, 173, 203, 205, 207, 209; 166/350

[56] References Cited

U.S. PATENT DOCUMENTS

| | | |
|---|---|---|
| 3,426,858 | 2/1969 | Bauer et al. ......................... 166/350 |
| 3,512,367 | 5/1970 | McLallen ............................ 405/171 |
| 3,611,734 | 10/1971 | Mott .................................... 114/294 |
| 3,708,811 | 1/1973 | Flory ....................................... 441/5 |
| 4,081,872 | 4/1978 | Pedersen et al. .................... 114/230 |
| 4,127,004 | 11/1978 | Vilain ................................. 405/205 |
| 4,387,660 | 6/1983 | Loire ................................. 405/207 |
| 4,573,425 | 3/1986 | Pomonik et al. .................... 114/230 |

Primary Examiner—Galen Barefoot
Assistant Examiner—Jesûs D. Sotelo
Attorney, Agent, or Firm—Dodge, Bush & Moseley

[57] ABSTRACT

An offshore bulk liquid discharge system and method for its deployment are disclosed. The system is adapted for rapid deployment and facilitates rapid unloading of liquids from an ocean tanker to a shore location. The system includes a base, a mooring buoy tethered to the base and floodable buoyancy tanks which may be flooded causing the base to land on the sea floor. A product swivel mounted on the base provides fluid communication between a tanker hose and a flexible pipeline.

36 Claims, 28 Drawing Figures

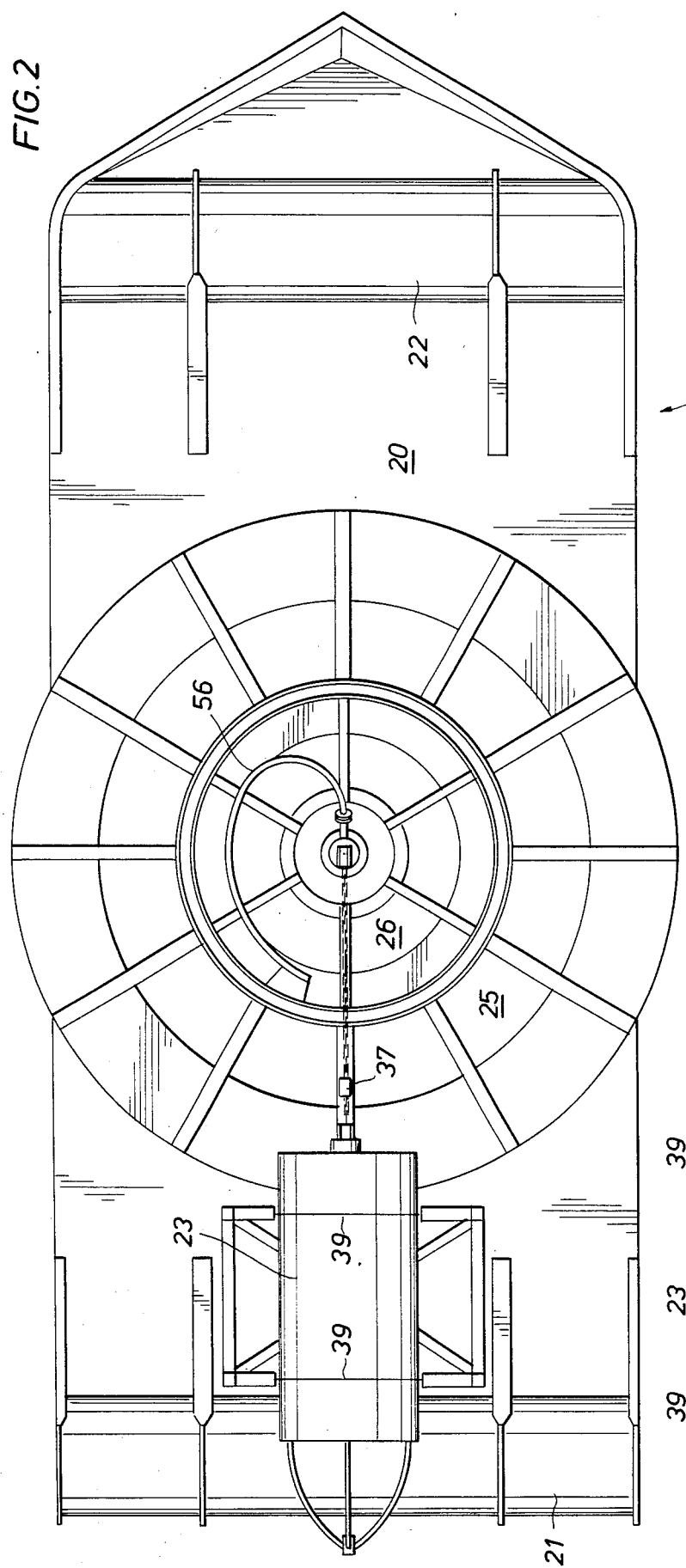

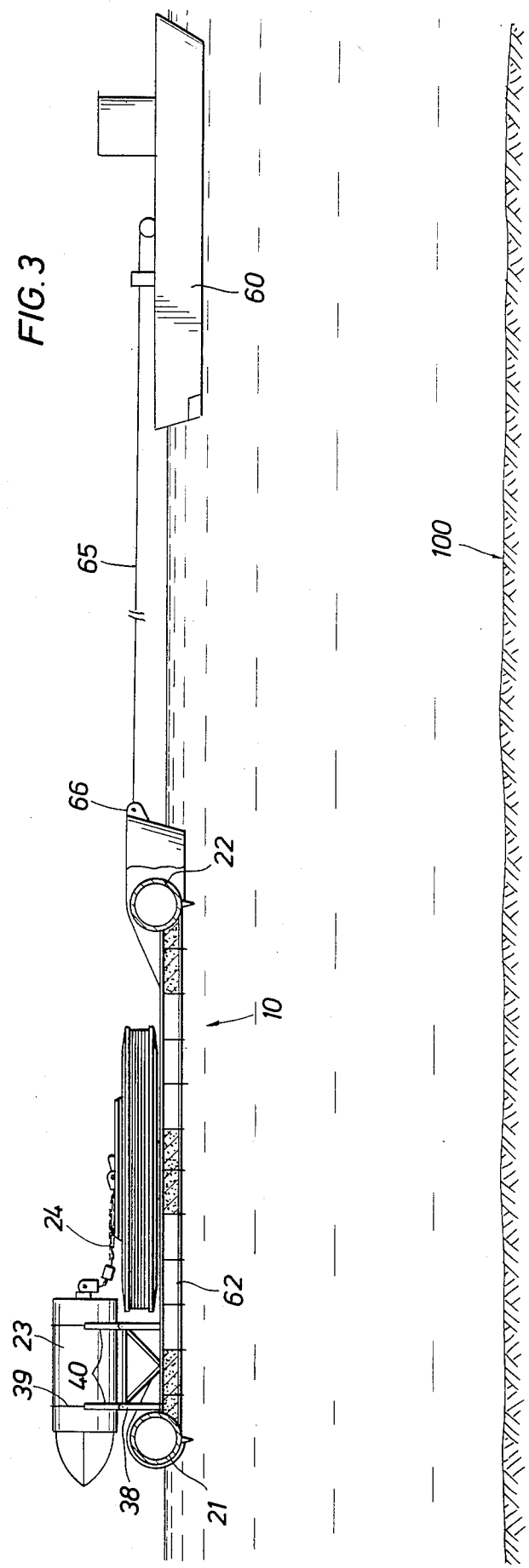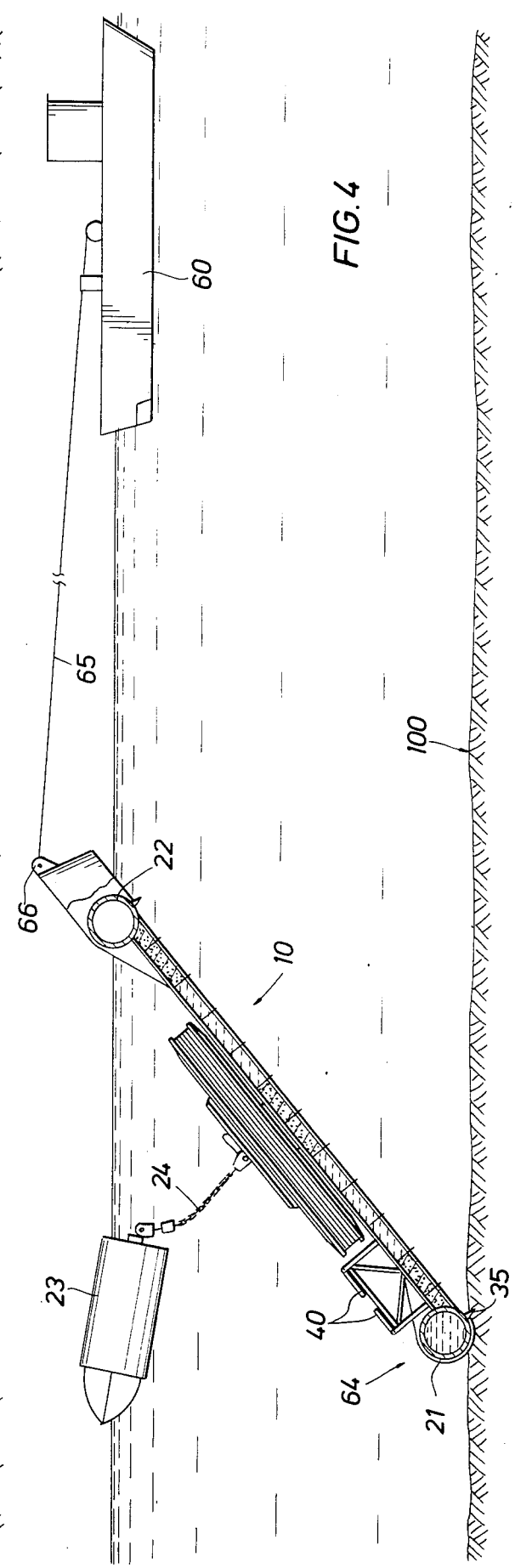

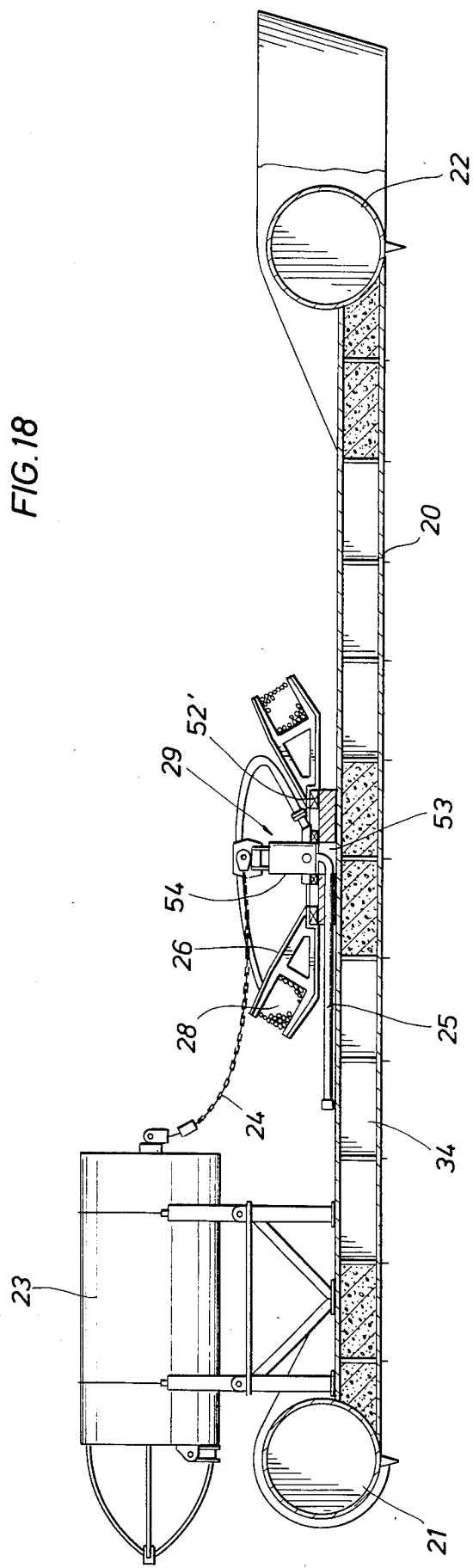

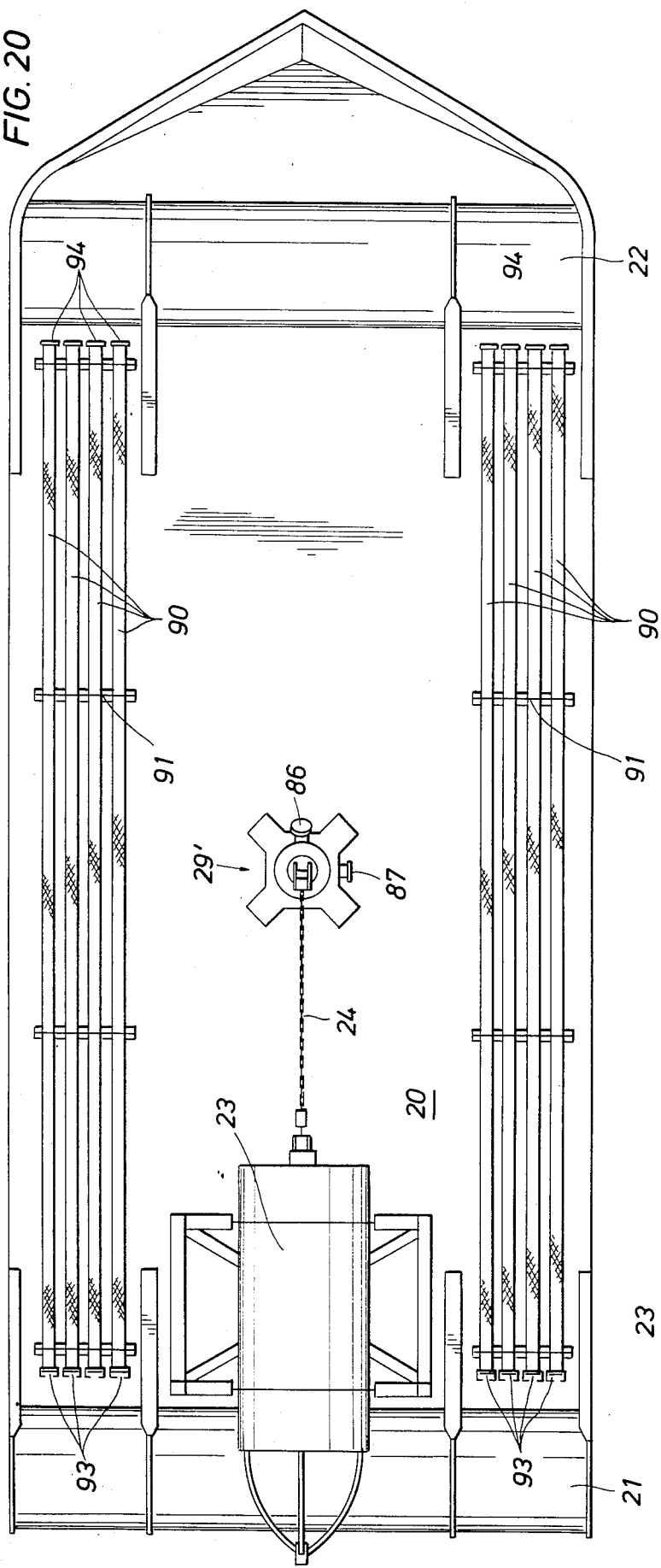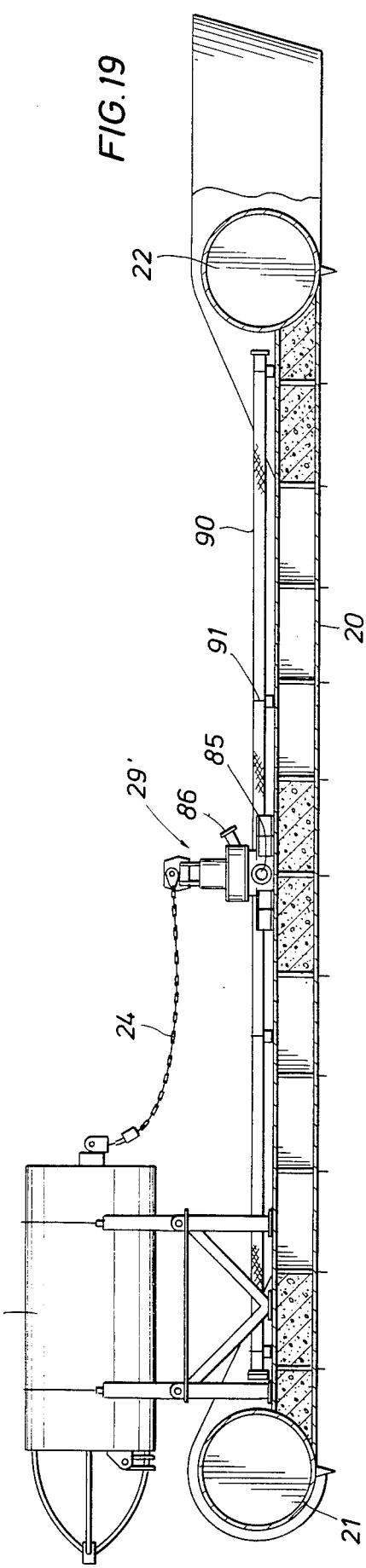

RAPID DEPLOYMENT MOORING AND DISCHARGE SYSTEM AND METHOD

CROSS REFERENCE

This application is a continuation of application Ser. No. 578,586 filed Feb. 9, 1984 (now abandoned), which is a continuation-in-part of application Ser. No. 503,638 filed June 13, 1983 (now abandoned).

BACKGROUND OF THE INVENTION

1. Field of the Invention

This invention relates generally to a mooring and discharge system and more particularly a rapid deployable and recoverable mooring and discharge system for unloading a liquid cargo from a tanker ship to a shore location. The invention relates to a method and apparatus which may be particularly advantageous for use in military activities whereby fuel from a tanker may be rapidly unloaded via a transportable mooring and pipeline system to a shore location, and which also may have general commercial applications.

2. Description of the Prior Art

Mooring systems and associated pipelines are known by which liquid such as oil aboard a tanker may be offloaded and transported to shore locations. Particularly in military situations, there is a potential need for rapid deployment of a mooring and pipeline system by which fuel from a tanker may be very quickly supplied to forces landed on a beach. Fuel may be dropped by helicopters, etc., but the quantity of fuel to support a large landing force must be provided by an ocean going tanker. Speed in offloading of the oil or fuel from the tanker to the shore forces is an obvious requirement.

It is therefore an object of the invention to provide a rapid deployable offshore mooring and bulk liquid discharge system and method for its operation.

It is a further object of the invention to provide a system which may be landed in relatively shallow water providing a mooring for an ocean going tanker and providing pipeline means from the tanker to a shore location.

It is a further object of the invention to provide such a rapid deployable offshore bulk liquid discharge system which may be used in relatively deep water.

It is a further object of the invention to provide a system which may be transported to a mooring location and in which a mooring buoy and rapid deployable pipeline system may be deployed from a tanker to the shore and carried in a single unitary system.

SUMMARY OF THE INVENTION

The objects mentioned above as well as other advantages and features of the invention are disclosed in the detailed description of the invention which follows. In summary, an offshore bulk liquid discharge system is provided comprising a base and buoyancy tank means attached to the base for providing flotation for the system during its transportation to a mooring location. The buoyancy tanks are adapted for flooding to allow the system to be deployed on the sea floor.

Pipeline reel means are provided for holding a coil of flexible pipeline during transportation of the system to a mooring location and for reeling the flexible pipeline to a shore facility after the system is deployed on the sea floor. A hose reel means is provided for holding a coil of flexible tanker hose during transportation of the system to a mooring location and for reeling the hose to a tanker after the system is disposed on the sea floor. A swivel piping means is provided for rotationally coupling a coil of flexible pipeline held in the pipeline reel means with a coil of tanker hose held in the hose reel means. A mooring buoy is combined with the discharge system and is releasably secured to the base. The buoy means is tethered to the base by a flexible securing means attached between the mooring buoy means and the base.

The pipeline reel means is mounted for rotation on a first slewing ring means disposed on the base and the hose reel means is mounted for rotation on a second slewing ring means disposed on the pipeline reel means. According to this feature of the invention, the pipeline reel means and the hose reel means are mounted for rotation about a common axis. The swivel piping means is preferably mounted coaxially with the pipeline reel means and the hose reel means. The swivel piping means comprises a central section adapted to rotate with the pipeline reel means and an outer swivel section fitted around the central section. Conduit coupling means are provided to allow fluid communication from the tanker hose held in the hose reel means to the outer swivel section and from the central swivel section to a conduit extending radially to the inner end of the flexible pipeline held in the pipeline reel means.

The above described embodiment of the invention is suitable for deployment in relatively shallow water of depth not exceeding approximately seventy (70) percent of the length of the base structure.

In another embodiment of the invention, a marine bulk liquid discharge system adapted for use in relatively deep water is provided having a base and first and second buoyancy tanks mounted at opposite ends of the base. Pipeline reel means, hose reel means and swivel piping means are provided on the base in a similar fashion to that described above for the shallow water embodiment of the invention. A buoy cradle releasably secured to the first end of the base is provided in which the primary buoy of the mooring system is releasably secured. Tether means is connected between the base and the primary buoy and a first block and tackle means mounted on the buoy cradle is releasably connected to the first end of the base. A first winch means is secured to the buoy cradle and is operably connected to the first block and tackle means for lowering the first end of the base toward the sea floor.

An auxiliary buoy is releasably secured at the other end of the base. A second block and tackle means mounted on the auxiliary buoy is releasably connected to the second end of the base. A second winch means secured to the auxiliary buoy and operably connected to the second block and tackle means is provided for lowering the second end of the base to the sea floor. As before, a swivel piping means is provided for rotationally coupling the coil of flexible pipeline held in the pipeline reel means with a coil of tanker hose held in the hose reel means.

The method of deployment of the offshore bulk liquid discharge system according to the invention includes as a first step the towing of the offshore bulk discharge system to a deployment location. The buoyancy tank means are then flooded and the secured mooring buoy is released while the base structure with pipeline and hose reels is lowered to the sea floor. The mooring buoy floats on the sea surface while being tethered to the base of the system. The outer end of the coil of flexible pipeline is then pulled to shore while the pipeline unreels from the pipeline reel means of the system. The outer end of the flexible tanker hose is pulled to a tanker while the hose unreels from the hose reel means. The tanker is then attached to the mooring buoy. The tanker may then be offloaded through the flexible tanker hose and flexible pipeline to an onshore storage facility.

The preferred method of landing the shallow water embodiment of the mooring system on the sea floor comprises the steps of first flooding the first buoyancy tank and allowing the first end of the base to be lowered to the sea floor. The second buoyancy tank disposed at the other end of the base is then flooded allowing the second end of the system to sink to the sea floor while simultaneously the buoy tether means pulls the buoy to the desired final vertical position with a predetermined residual tension in the tether means. For positional control of the system during the lowering process, the method may include the step of attaching holding lines between the second end of the system and a retaining vessel which maintains position under power or is anchored with fluke imbedment anchors.

The step of pulling the end of the flexible pipeline to shore comprises the substeps of attached a tow line between the end of the flexible pipeline on the pipeline reel means and a towing vessel and then pulling the flexible pipeline as close to shore as operationally possible with the towing vessel. The tow line is then disconnected from the end of the flexible pipeline and a winch line is unspooled from an onshore winch and is attached to the end of the flexible pipeline. The winch line is then spooled about the onshore winch until the flexible pipeline is landed onshore.

An alternative method of deploying the shallow water embodiment of the mooring system on the sea floor is to first tow the system to a position close to the desired shore location. While the system is floating, a winch line is unspooled from an onshore winch and attached to the end of the flexible pipeline. The winch line is spooled onto the winch until the flexible pipeline is landed on shore. The system is then towed to the deployment location as the flexible pipeline unspools from the pipeline reel. The system is then disposed on the sea floor by flooding the buoyancy tanks and the tanker hose is connected to the tanker and the tanker is attached to the mooring buoy as above.

The system adapted for use in deep water is deployed by first towing it to a deployment location. The buoy cradle is then disconnected from its secured connection at the first end of the base after which the first buoyancy tank is flooded. The first end of the base is then lowered into the sea by means of the first winch means and the first block and tackle means until the base is inclined with respect to the surface of the sea. The auxiliary buoy connected to the second end of the base is then disconnected from the base and the second buoyancy tank is flooded. The base is then lowered into the sea while being substantially in the inclined position by means of the first winch and block and tackle means and the second winch and block and tackle means until the first end of the base lands on the sea floor. The inclined position of the base allows the tether means between the buoy and the base to remain slack during the lowering operation.

The mooring buoy is then disconnected from the buoy cradle and the first block and tackle means is disconnected from the first end of the base. The second end of the base is then lowered by means of the second winch and block and tackle means until the base rests on the sea floor. Simultaneously the buoy tether means pulls the buoy to the desired final position with a predetermined residual uplift tension in the tether means. The second block and tackle means is then disconnected from the second end of the base.

After the base is landed on the sea floor, the end of the coil of flexible pipeline is pulled to shore while it is unreeled from the pipeline reel means. The end of the flexible tanker hose is pulled to a tanker while the hose unreels from the hose reel means. The tanker is then attached to the mooring buoy completing the method of mooring a tanker and deploying a pipeline conduit from the tanker to the onshore facility.

According to an alternative embodiment of the invention, the system described above is provided without the tanker pipeline reel mounted on the base. A conduit coupled to the product swivel is provided for connecting the tanker hose to a pipeline laid between the system and onshore storage facilities by conventional marine pipeline laying means or specially designed separate deployment means.

Another embodiment of the invention provides sections of tanker hose releasably secured to the base of the system. As the system is deployed on the sea bed, the sections are coupled end to end creating a tanker hose for connection between coupling means on the base of the system and a tanker. A pipeline laid between the system and onshore storage facilities is also connected to the coupling means completing the fluid communication conduit between the vessel and the onshore storage facilities.

Another embodiment of the invention is similar to the shallow water embodiment of the invention, yet provides a relatively small secondary or auxiliary buoy connected to the anchor chain which in turn is connected to the base. Adapted for extremely shallow water where the primary mooring buoy is too large to float vertically above the base, the system of this embodiment is used by first deploying the system on the sea floor according to one of the methods above. After the secondary buoy floats on the sea surface while being attached to the base of the system by means of the anchor chain, the end of the flexible tanker hose may be pulled to a tanker while the hose unreels from the hose reel means, and the tanker may be attached to the secondary mooring buoy. The primary buoy may be allowed to float free from the base while the system is being deployed on the sea floor.

When the system is deployed with the smaller secondary buoy, the anchor cannot remain moored in as severe sea conditions as when the primary buoy is used.

BRIEF DESCRIPTION OF THE DRAWINGS

The foregoing summary of the invention and other objects and advantages of the invention will be described in more detail below taken in conjunction with the accompanying drawings of which:

FIGS. 1 and 2 are a side and top view of the rapid deployment mooring and discharge system according to the invention illustrating the base, buoyancy tanks, mooring buoy and pipeline reel and hose reel;

FIGS. 3 through 6 illustrate the method of deploying the system of FIGS. 1 and 2 in relatively shallow water;

FIG. 18 illustrates an alternative embodiment of the invention in which the pipeline reel is omitted from the system of FIGS. 1, 2 or FIGS. 11, 12, 13;

FIGS. 19 and 20 illustrate an alternative embodiment of the invention in which the pipeline reel and the hose reel are omitted from the system of FIGS. 1, 2 or FIGS. 11, 12, 13 and in which the tanker hose is locked to the base in sections for connection and deployment between a tanker and a product swivel mounted on the base;

DESCRIPTION OF THE INVENTION

Figure 5:
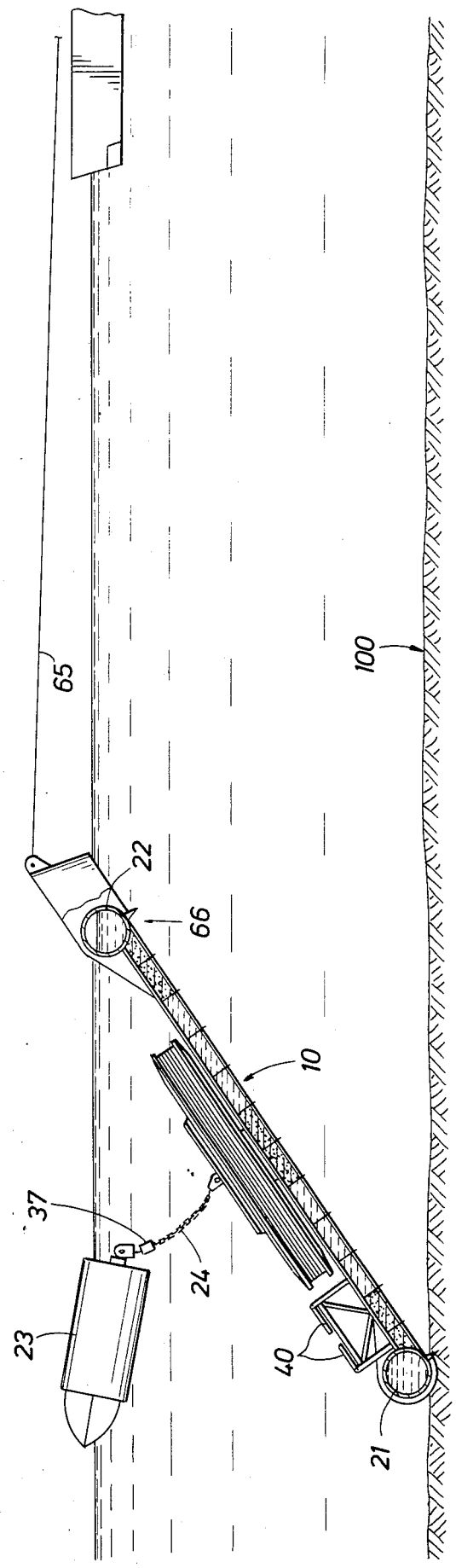

FIGS. 1 and 2 illustrate in a side and plan view the preferred embodiment of the system according to the invention which is especially adapted for use in relatively shallow water. The system 10 includes a base 20 with floodable buoyancy tanks 21 and 22 disposed at either end of the base. A mooring buoy 23 is secured to a support structure 38 on the base by means of two hinged buoy cradle brackets 40 and releasable securing straps 39. Mounted on the base is a pipeline reel 25 which is free to rotate about centerline 50 on slewing rings 51. The pipeline reel holds a coil of flexible pipeline 27.

Mounted coaxially and nested above the pipeline reel 25 is a hose reel 26 mounted to rotate with respect to the pipeline reel 25 on slewing rings 52. A product swivel 29 is disposed coaxially with centerline 50 and includes a control section 53 fixed to the pipeline reel 25 and an outer swivel section 54 free to rotate independently. A conduit 55 provides communication between the inner terminating end of pipeline coil 27 and the central section 53 of product swivel 29. The outer swivel section 54 includes a conduit coupling means 56 to which the inner end of the hose coil 28 is attached.

The pipeline reel 25 and the hose reel 26 are free to rotate with respect to each other and to the base 20 while the hose 28 and pipeline 27 are in fluid communication with each other via the product swivel 29 and conduit 55.

A tether 24 is attached to the lower end of mooring buoy 23. Preferably the tether 24 is attached to the top of the central section 53 of product swivel 29. Universal joints 30 and 31 terminate the tether 24 at the end of mooring buoy 23 and at the top of swivel 29. Preferably tether 24 is an anchor chain. An anchor leg swivel 37, allowing the buoy to rotate independently, is preferably inserted in the tether means.

The base is segmented into a plurality of compartments, some of which are filled with concrete ballast illustrated by reference numerals 33. Others of the compartments 34 may be empty, providing flotation to the base during transport of the system to the deployment location, yet being filled with water during deployment of the base on the sea floor. Soil penetration skirts 35 and soil shear ribs 36 provide shear resistance between the vehicle and the sea floor once the system is landed on the sea floor. Alternatively, a number of short spud piles penetrating the sea floor may be provided to achieve adequate resistance against sliding of the base.

FIGS. 3 through 6 illustrate the steps of the method of landing the system 10 on the sea floor 100. As illustrated in FIG. 3, a towing vessel 60 is used to tow the system 10 to the desired deployment location. During towing, the tether or anchor chain 24 may be adjusted to the proper length corresponding to the depth of water at the deployment location.

FIG. 4 illustrates the lowering of the system 10 into the sea after all empty hull compartments such as 62 of system 10 have been flooded and the buoy tie down cables 39 have been released. After the buoy 23 floats free as illustrated, the hinged buoy cradle brackets 40 are laid down on top of the support structure to reduce the obstruction height of the installed system to a minimum. The buoyancy tube 21 is illustrated as being flooded in FIG. 4. The base structure 20 gradually tilts down until the end 64 of system 10 is landed on the sea floor with soil penetration skirt 35 engaging the sea floor 100.

FIG. 5 illustrates the condition of the system 10 as buoyancy tube 22 is filling with water. With the complete flooding of buoyancy tube 22, the opposite end 66 of system 10 sinks to the bottom of the sea floor.

Figure 6:
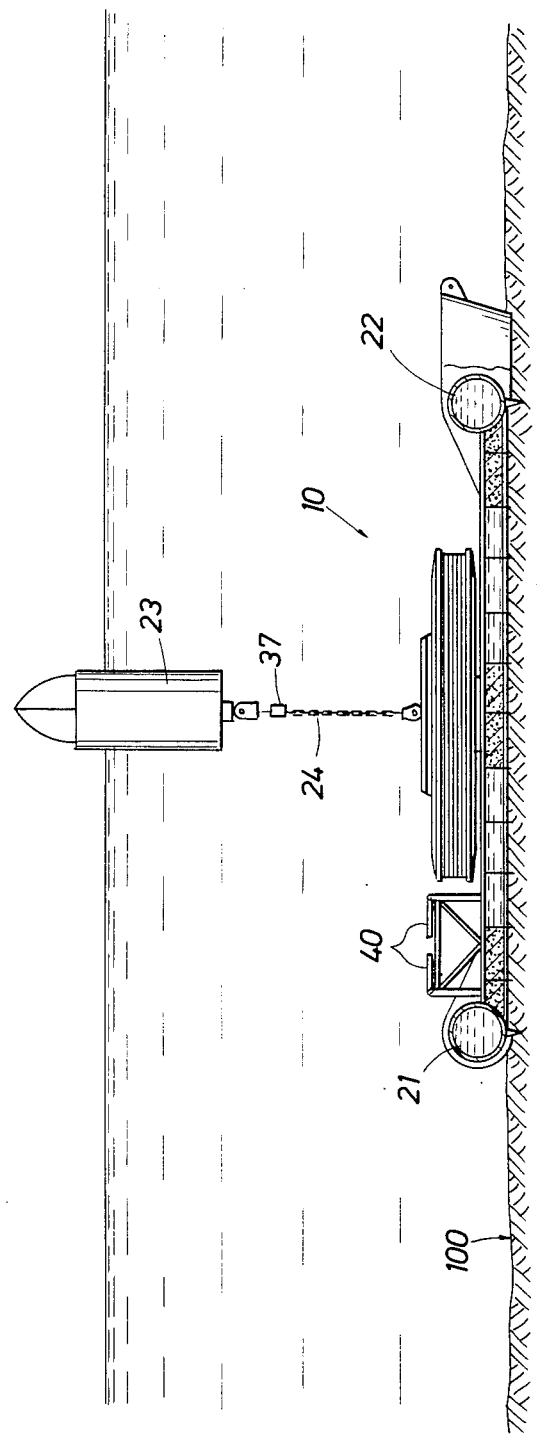
Figure 7:
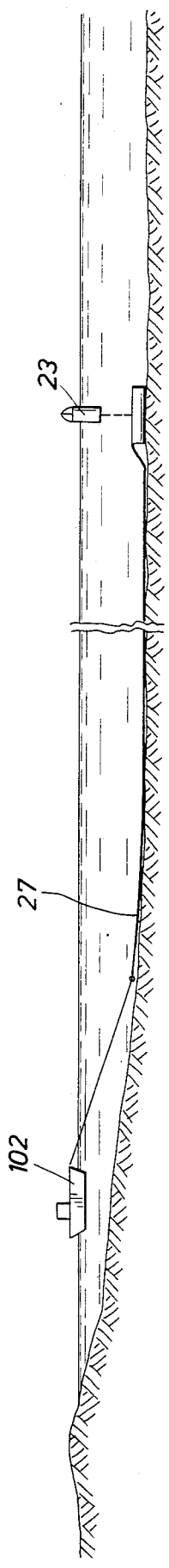
FIGS. 7 through 10 illustrate the deployment of the flexible pipeline to an onshore facility and the flexible hose to a tanker and the mooring of a tanker vessel to the mooring buoy.
Figure 8:
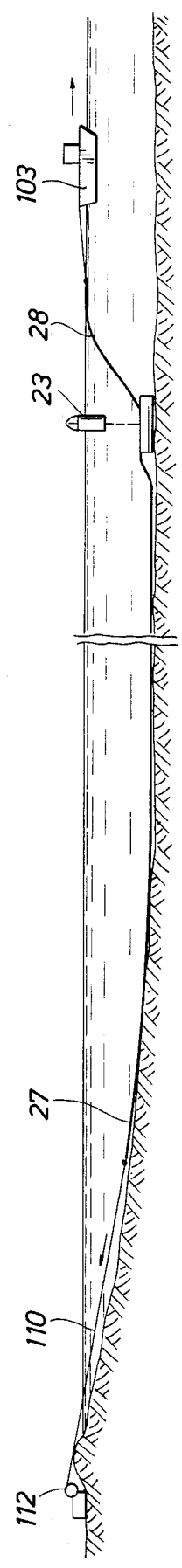

FIG. 6 illustrates the condition of the system 10 after it has been landed on sea floor 100 and the mooring buoy 23 is pulled down to its final vertical position and is tethered to the system 10 by means of tether 24. The length of the tether 24 is selected such that the mooring buoy 23 is pulled down to a depth that produces adequate buoyancy uplift on the buoy to maintain a predetermined tension force in the tether 24 under conditions of low tide.

FIGS. 7 through 10 illustrate the deployment of the pipeline 27 and the flexible hose 28. A towing vessel 102 is attached to the end of flexible pipeline 27 unreeling flexible pipeline 27 from pipeline reel 25. The empty flexible pipeline has a net submerged weight adequate to stabilize the pipeline on the sea floor but light enough to be pulled to shore without excessive friction resistance along the sea floor.

Figure 9:
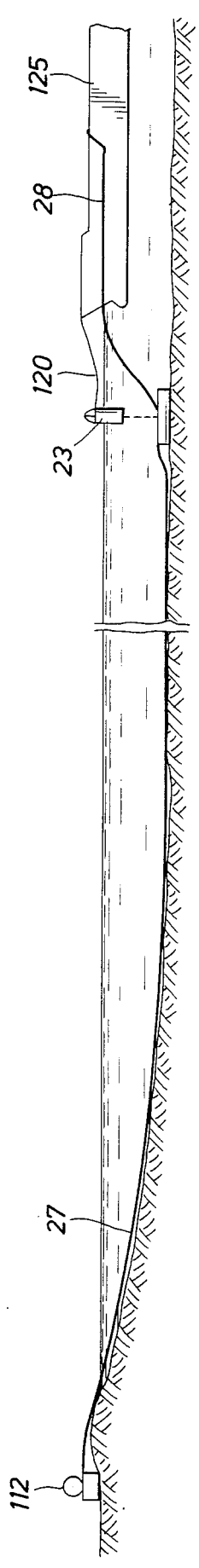

After a point is reached beyond which the depth of the water becomes too shallow for vessel 102 to operate, a line 110 is unspooled from an onshore winch 112 and connected to the end of flexible pipeline 27. As illustrated in FIG. 9, winch 112 pulls the flexible pipeline onshore where it may be connected to onshore storage facilities 115 as illustrated in FIG. 10.

Returning now to FIG. 8, the end of the flexible hose on hose reel 26 is unreeled by pulling on its end from a vessel 103. The flexible hose has adequate built-in buoyancy capacity to float the hose not only during connection to the tanker 125, but also after the hose is filled with liquid cargo product. FIG. 9 illustrates that a tanker may then be moored to the mooring buoy 23 by means of a mooring hawser 120. Flexible hose 28 may be connected to the discharge or unloading connection of tanker 125.

Figure 10:
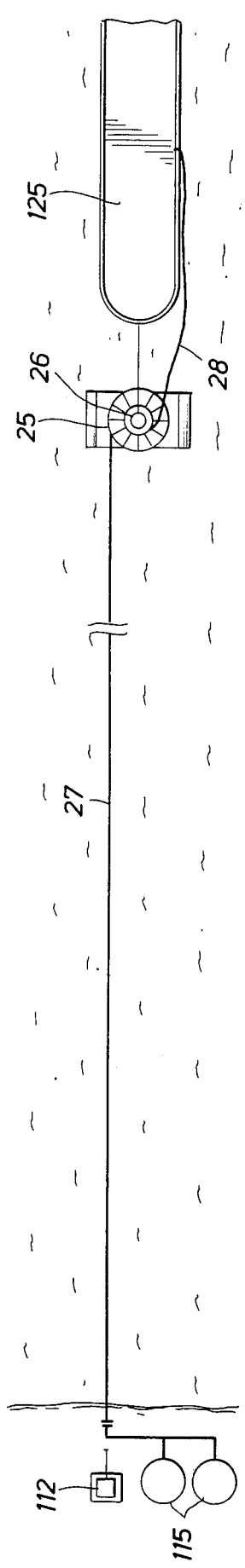

FIG. 10 illustrates in plan view that the hose 28 is spooled from reel 26 while flexible pipeline 27 is spooled from pipeline reel 25.

Thus there has been provided a method and system by which a tanker laden with fuel or other liquids may be rapidly provided with a deployed mooring system and discharge conduit by which its contents may be discharged for onshore storage.

Figure 12:
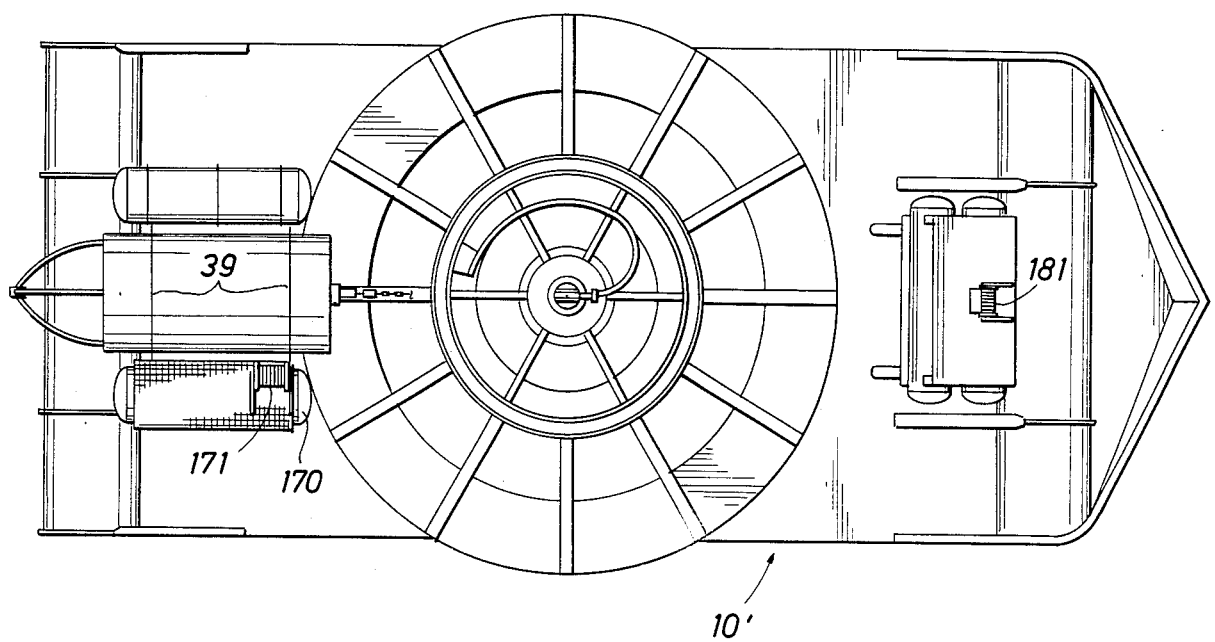
FIGS. 11, 12 and 13 illustrate in side, top and end views an alternative embodiment of the system especially adapted for deployment in relatively deep water and especially illustrating a first block and tackle and winch means associated with the mooring buoy and an auxiliary buoy and second block and tackle and winch means associated with the opposite end of the system.
Figure 11:
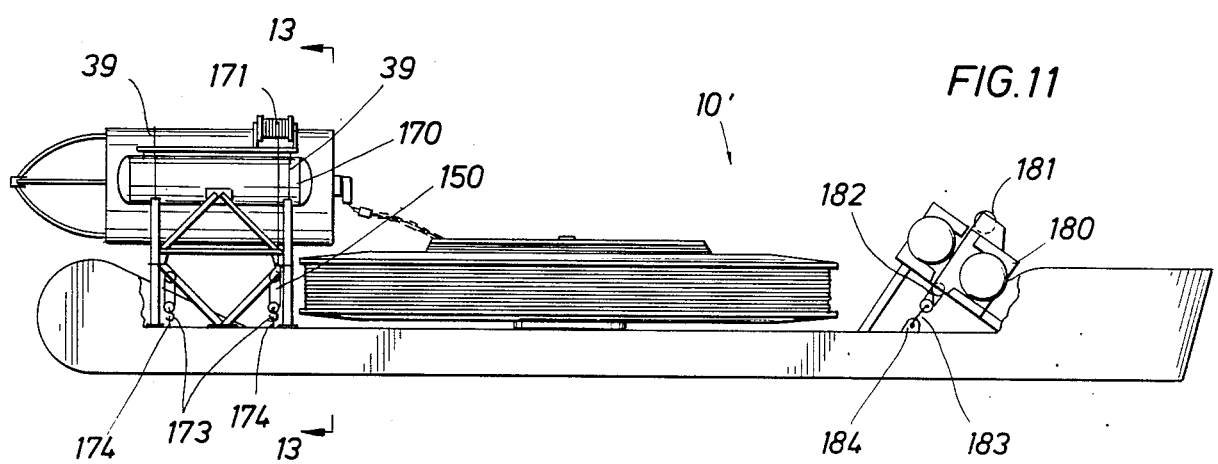
Figure 13:
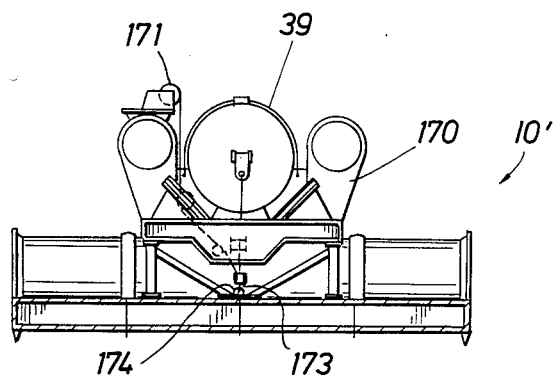

An alternative embodiment of the invention, system 10', is illustrated in FIGS. 11, 12 and 13 in side, top and end views. The system depicted in FIGS. 11, 12 and 13 are essentially the same as those illustrated in FIGS. 1 and 2 but with additional apparatus provided enabling the system to be landed in a controlled and safe manner in relatively deep water. A first block and tackle means 150 is attached to winch buoy cradle 170. First winch 171 mounted on winch buoy cradle 170 is operationally connected to block and tackle means 150. The block and tackle means 150 are attached to base 20 by means of hooks 173 in lifting padeye 174. At the second end of the base 20 is provided an auxiliary buoy 180 with a second winch 181 and a second block and tackle means 182 which is connected to the base 20 by means of hook 183 in lifting padeye 184. In other respects, the system 10' as shown in FIGS. 11, 12 and 13 is identical to the system shown in FIGS. 1 and 2.

Figure 14:
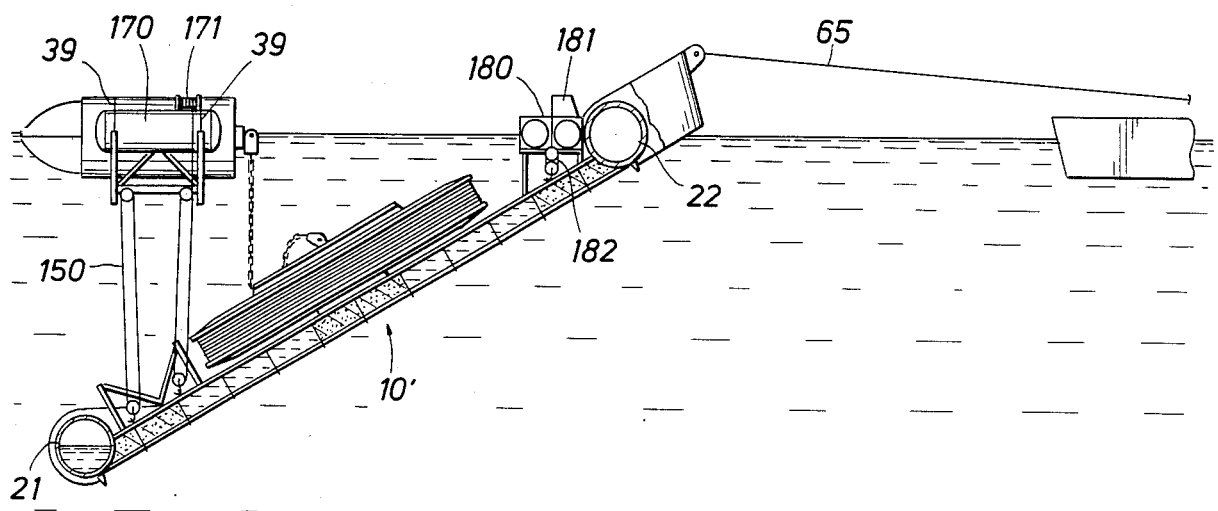
FIGS. 14 through 17 illustrate the method of landing the system illustrated in FIGS. 11 through 13 in relatively deep water.

FIGS. 14 through 17 illustrate the steps of the method of landing the deep water embodiment of the system 10' in preparation of unspooling pipeline 27 and hose 28 connecting a tanker 25 with an onshore storage facility 15. FIG. 14 illustrates the first step in the method of landing system 10'. First, all the empty hull compartments are flooded, and then the buoyancy tank 21 is flooded until the first end of the system 10' is beginning to submerge. The block and tackle means 150 under the control of winch 171 on buoy cradle 170 is then caused to lower the first end of system 10' to an inclined position as illustrated in FIG. 14.

Figure 15:
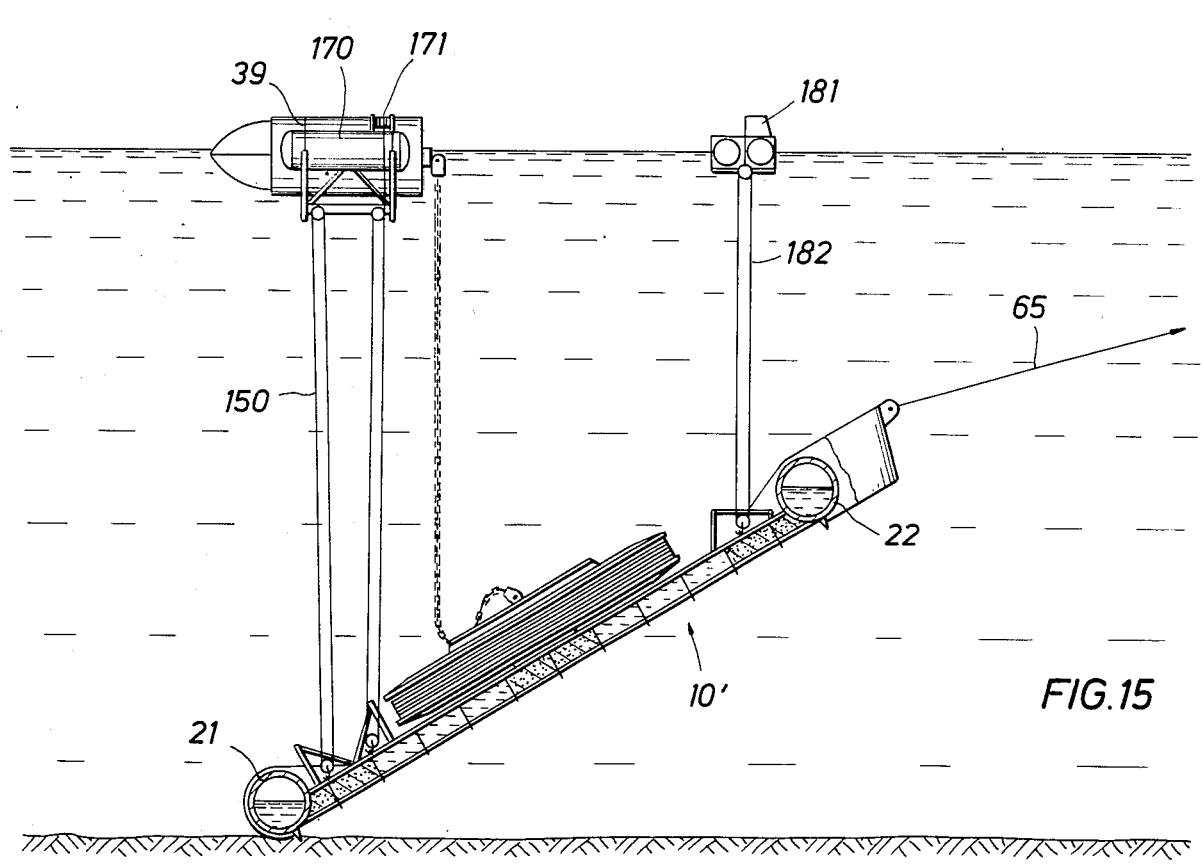

FIG. 15 illustrates that the buoyancy tube 22 is flooded until the second end of system 10' is initially submerged. At that point, the entire system 10' is lowered in the inclined position as illustrated in FIG. 15 whereby the block and tackle means 150 under control of winch 171 and block and tackle means 182 under control of winch 181 are lowered at substantially the same rate until the end of system 10' at which buoyancy tube 21 is disposed lands on the sea floor 100.

Figure 16:
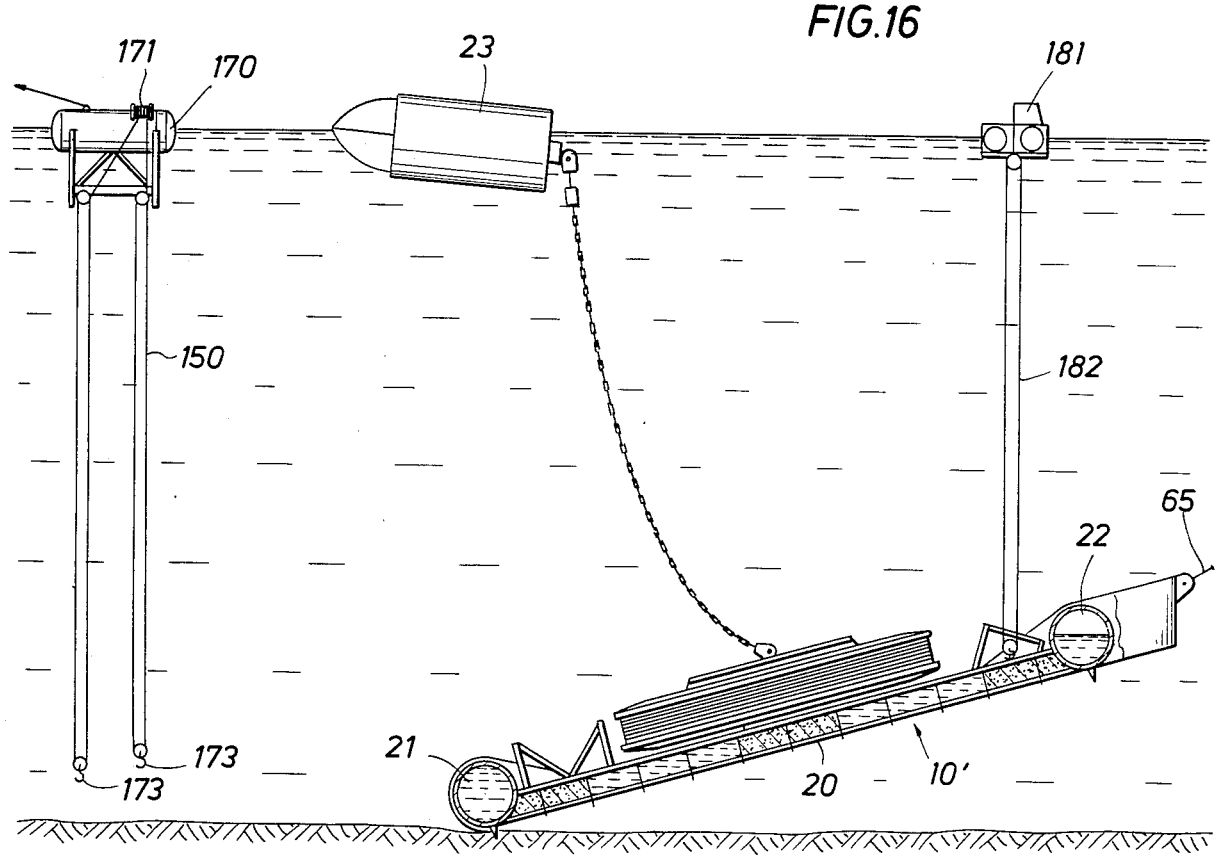

The buoyancy tube 21 is then completely flooded and the winch 171 is allowed to completely pay out until the block and tackle means 150 are slack. The buoy tie-down cables 39 are then released and the hooks 173 are disconnected from system 10'. At that point, the buoy cradle 170 is removed from the buoy 23 leaving the buoy 23 floating freely as illustrated in FIG. 16.

Figure 17:
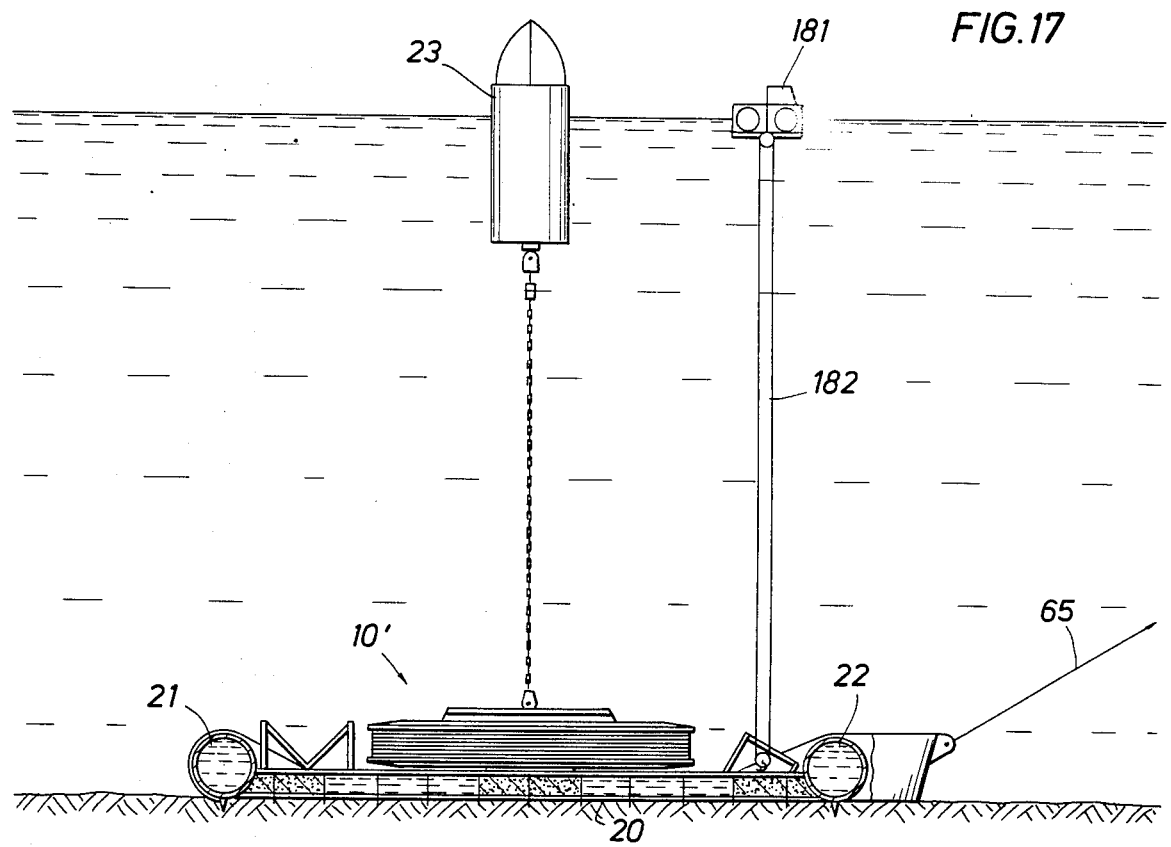

FIG. 17 illustrates the next step in the method of deploying the system 10' in relatively deep water. The end of system 10' at which buoyancy tank 22 is disposed is lowered to the sea floor by the auxiliary buoy winch 181. The second buoyancy tube 22 is then completely flooded and the auxiliary winch 181 and block and tackle means 182 are released from the system 10'. After landing as illustrated in FIG. 17, tow line 65 is also released from base 20. The deployment of the pipeline 27 on pipeline reel 25 to an onshore location is identical to the method outlined and illustrated with respect to FIGS. 7 through 10 discussed above. Likewise, the deployment of the flexible hose 27 from hose reel 26 is deployed to a tanker which is moored to mooring buoy 27.

Thus there has been provided alternative embodiments of a system and method for rapid deployment of a mooring and bulk liquid discharge system for marine operations.

After the need for the tanker discharge facility at a given deployment location has ended, the entire system may be recovered for future redeployment by simply reversing the deployment procedures described herein.

Another alternative embodiment of the invention is illustrated in FIG. 18 which may be adapted for use with the shallow water embodiment of the invention illustrated in FIGS. 1 and 2 or the deep water embodiment of the invention of FIGS. 11, 12 and 13. As FIG. 18 illustrates, the pipeline reel 25 of FIGS. 1 and 2 or FIGS. 11, 12 and 13 may be omitted from the system. After the system of FIG. 18 is deployed on the sea floor, a pipeline may be connected to conduit 25 and then laid along the sea bed to an onshore storage facility through the use of specially designed separate deployment means or conventional marine pipeline laying equipment and techniques. Fluid communication is established through the pipeline and conduit 25 and via product swivel 29 to tanker hose 28. Tanker hose 28 is then connected to the tanker and the tanker is moored to the mooring buoy in the same manner as described previously.

Another embodiment of the invention is illustrated in FIGS. 19 and 20. The pipeline hose reel and tanker hose reel of the embodiments of FIGS. 1, 2 and 11, 12 and 13 are eliminated, but tanker hose sections 90 are secured to the base 20 by means of hose lashings 91. Tanker hose sections 90 have connecting means 94, 93 provided at each end to connect a cargo laden tanker to a tanker hose connection flange of connection conduit 86 of the swivel piping means 29'. The connecting means 94, 93 may be bolting flanges or alternatively quick connect couplings. A pipeline connection flange of connection conduit 87 is provided to connect a pipeline to a shore facility deployed by a conventional reel barge or by other specially designed separate deployment means.

In operation, the system illustrated in FIGS. 19 and 20 is transported to an offshore position convenient to offshore location storage facilities to be connected with an ocean going tanker. In relatively shallow water the system is deployed on the sea floor according to the method illustrated in FIGS. 3, 4, 5 and 6. Before sinking of the base, the tanker hose sections 90 are released from lashings 91. During the sinking of the base to the sea bed, the sections 90 are assembled end to end into a floating hose string. The hose string comprising lengths of hose sections 90 is connected to the tanker hose connection conduit 86 of the swivel piping means 29' during the lowering of the base 20 to the sea floor, or after the base has been set on the sea bed. The hose string is connected to the tanker, and the end of a pipeline connected to pipeline connection conduit 87, is deployed to the shore storage facilities by a conventional reel barge or by other specially designed separate deployment means. Diver assistance in assembling the tanker hose sections and connection of the tanker hose conduit 86 of swivel piping means 29' is required during deployment of the system illustrated in FIGS. 19 and 20.

In other respects, the system of FIGS. 19 and 20 is substantially the same as that of FIGS. 1 and 2. The relatively deep water embodiment of the system illustrated in FIGS. 11, 12 and 13 (of course without the pipeline and hose reels) may be also used with the embodiment of FIGS. 19 and 20 in order to control the setting of the base 20 on the sea bed in relatively deep water.

Figure 21:
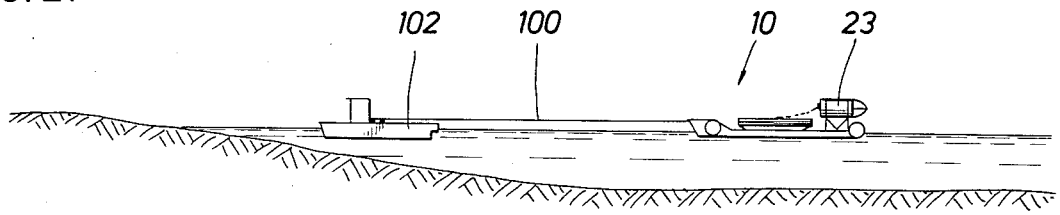
FIGS. 21–24 illustrate the alternative method for connecting the flexible pipeline to shore by attaching a winch line to the end of the pipeline while the system is floating close to shore and then towing the system to a deployment location while unspooling the pipeline from the pipeline reel.
Figure 22:
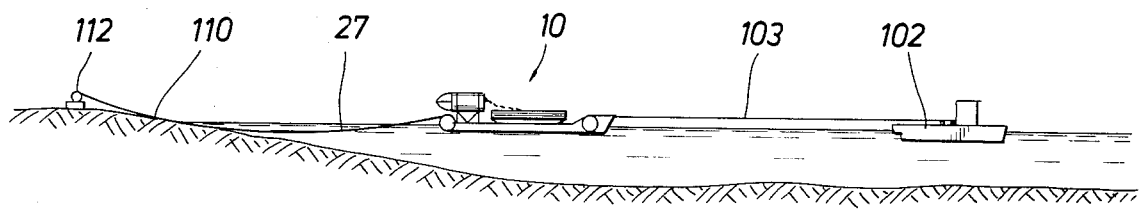
Figure 23:
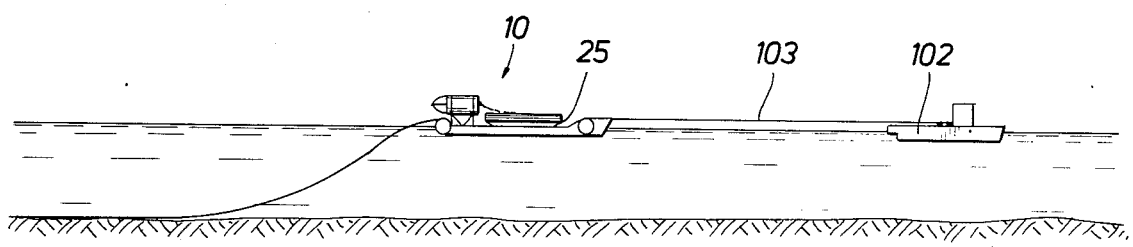
Figure 24:
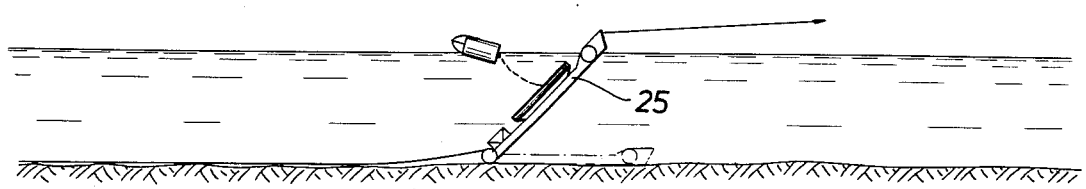
Figure 25:
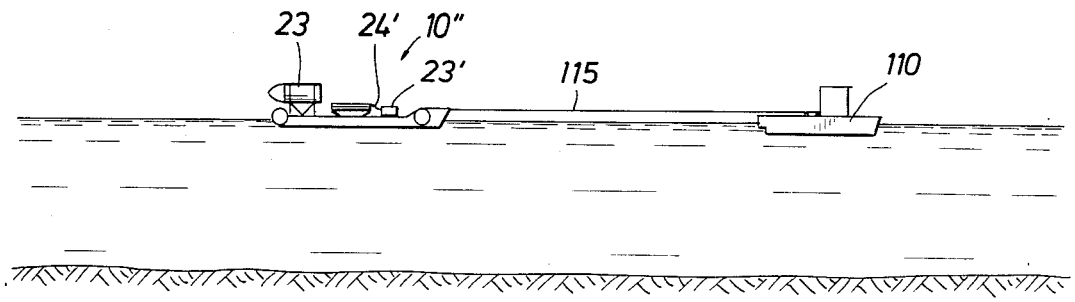
FIGS. 25–28 illustrate an alternative system and method for its deployment in extremely shallow water, the system having an auxiliary or secondary buoy which serves to vertically orient an anchor chain connected to the base of the system after the base of the system has been placed on the sea floor and to allow attachment of a mooring rope from the vessel to the anchor chain.
Figure 26:
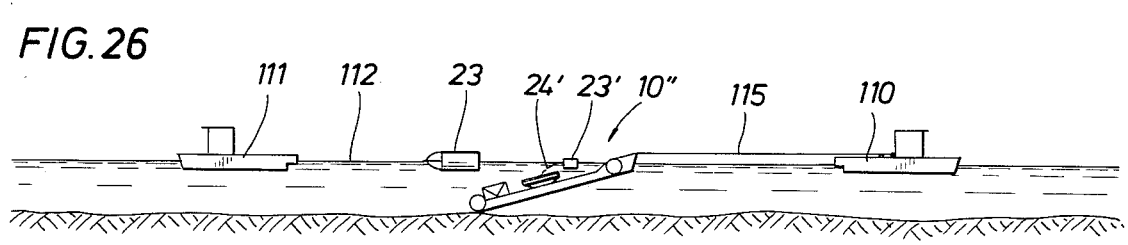
Figure 27:
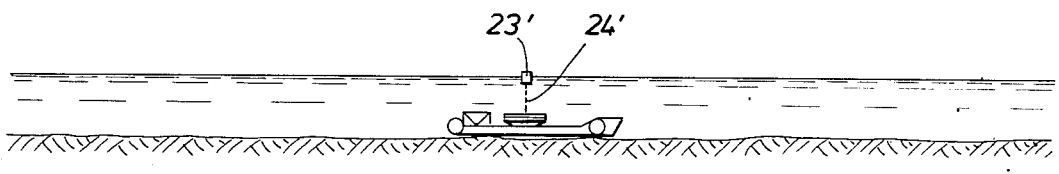

FIGS. 21–24 illustrate an alternative method for deploying either the shallow water or relatively deeper water system 10 (or 10'). FIG. 21 shows the system 10 being towed as close to shore as possible by means of a towing vessel 102. In FIG. 22, the system 10, before it is deployed on the sea floor has the end of its flexible pipeline 27 secured to a winch line 110 unspooled from an onshore winch 112. The system 10 is then towed to its deployment location by towing vessel 102 (as illustrated in FIG. 23) while the pipeline 27 is unspooled from reel 25. The system is deployed as illustrated in FIG. 24 according to one of the methods described previously depending on whether the deployment location has relatively shallow or relatively deep water.

FIGS. 25–28 illustrate an alternative system and method for deploying the system according to the invention in extremely shallow water where the primary buoy doesn't have enough water to vertically orient its anchor chain which connects it to the base of the system. In addition to the primary buoy 23, an auxiliary or secondary buoy 23' is connected to the base of the system by means of anchor chain 24'. At the deployment location illustrated in FIG. 26, the primary buoy 23 is allowed to float free as the system 10" is sunk to the sea floor. An auxiliary towing vessel 111 may be used to pull primary buoy 23 from away from the system 10".

As the system 10" is deployed on the sea floor, secondary buoy 23' floats on the surface of the sea operably vertically orienting anchor chain 24'.

Figure 28:
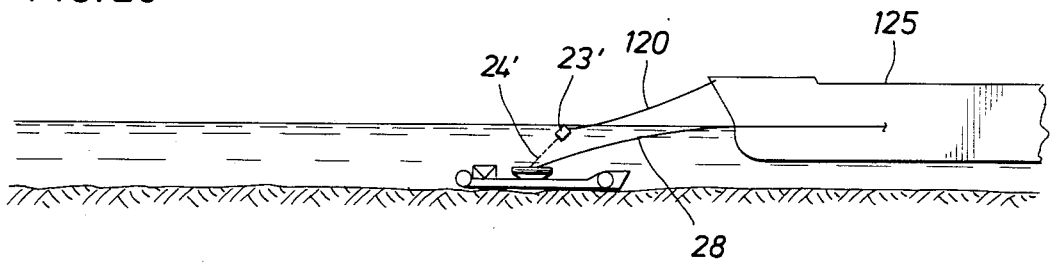

As illustrated in FIG. 28, a tanker 125 may be moored by attaching a mooring line 120 to anchor chain 24' and buoy 23' and the tanker hose 28 may be connected between the system 10" and tanker 25. A pipeline to shore connecting an onshore storage facility with the tanker 125 and line 28 may be provided according to one of the methods and systems described above.

It should be understood that the smaller secondary buoy will provide substantially less restoring force than the primary buoy. The compliancy of the mooring system will therefore be much reduced, and the moored tanker cannot safely remain at the mooring in as severe sea conditions as when the primary buoy is used.

Various modifications and alterations in the described system and method will be apparent to those skilled in the art from the foregoing description which does not depart from the spirit of the invention. The foregoing disclosure and description mentioned are illustrative and explanatory thereof and details of the illustrative embodiments may be made without departing from the spirit of the invention.

What is claimed is:

1. An offshore bulk liquid discharge system comprising
   a base,
   buoyancy tank means attached to the base for providing flotation for the system during transportation of the system to a mooring location and adapted for flooding to allow the system to be disposed on the sea floor,
   pipeline reel means for holding a coil of flexible pipeline during transportation of the system to a mooring location and for unreeling the flexible pipeline after the system is disposed on the sea floor,
   hose reel means for holding a coil of flexible tanker hose during transportation of the system to a mooring location and for unreeling the hose after the system is disposed on the sea floor, and
   swivel piping means for rotationally coupling a coil of flexible pipeline held in the pipeline reel means with a coil of tanker hose held in the hose reel means.

2. The system of claim 1 further comprising a mooring buoy means releasably secured to the base, the buoy means being tethered to the base by a flexible securing means attached between the mooring buoy means and the base.

3. The system of claim 2 further comprising releasable securing means having
   a support structure means attached to the base,
   buoy cradle means connected to the support structure by hinge means,
   the buoy cradle means being in an upwardly extending position for connecting releasable buoy cradle bracket means about the buoy means, whereby after the buoy means is separated from the buoy cradle bracket means, the cradle means may be rotated by the hinge means to a non-vertical position so as to minimize the vertical height of the system.

4. The system of claim 2 wherein the flexible securing means is an anchor chain and further comprising universal joint means connecting the anchor chain to the mooring buoy means and to the base.

5. The system of claim 1 wherein the pipeline reel means and the hose reel means are mounted for rotation about a common axis.

6. The system of claim 5 wherein the pipeline reel means is mounted for rotation on a first slewing ring means disposed on the base and the hose reel means is mounted for rotation on a second slewing ring means disposed on the pipe line reel means.

7. The system of claim 5 wherein the swivel piping means is mounted coaxially with the pipeline reel means and the hose reel means, the swivel piping means comprising
   a central section adapted to rotate with the pipeline reel means,
   an outer swivel section adapted to rotate independently of the pipeline reel means, and
   conduit coupling means for providing fluid communication between a conduit extending from the central section to a coil of flexible pipeline held in the pipeline reel means and the conduit coupling means allowing fluid communication between the outer swivel section and a coil of tanker hose held in the hose reel means.

8. The system of claim 1 wherein the buoyancy tank means comprise
   a first buoyancy tank disposed at one end of the base, and
   a second buoyancy tank disposed at the other end of the base.

9. A marine bulk liquid discharge system comprising
   a base,
   a first buoyancy tank mounted at a first end of the base and having means for flooding the first tank, a second buoyancy tank mounted at a second end of the base and having means for flooding the second tank, pipeline reel means for holding a coil of flexible pipeline during transportation of the system to a mooring location and for unreeling the flexible pipeline after the system is disposed on the sea floor, hose reel means for holding a coil of flexible tanker hose during transportation of the system to a mooring location and for unreeling the hose after the system is disposed on the sea floor, a buoy cradle releasably secured at a first end of the base, a primary buoy releasably secured in the buoy cradle, tether means connected between the base and the primary buoy, first block and tackle means mounted at the buoy cradle and releasably connected to the first end of the base, first winch means secured to the buoy cradle and operably connected to the first block and tackle means for lowering the first end of the base toward the sea floor, an auxiliary buoy releasably secured at a second end of the base, second block and tackle means mounted on the auxiliary buoy and releasably connected to the second end of the base, second winch means secured to the auxiliary buoy and operably connected to the second block and tackle means for lowering the second end of the base toward the sea floor, and swivel piping means for rotationally coupling a coil of flexible pipeline held in the pipeline reel means with a coil of tanker hose held in the hose reel means.

10. The system of claim 9 wherein the tether means is an anchor chain and further comprising universal joint means connecting the anchor chain to the primary buoy and the anchor chain to the base.

11. The system of claim 9 wherein the pipeline reel means and the hose reel means are mounted for rotation about a common axis.

12. The system of claim 11 wherein the pipeline reel means is mounted for rotation on a first slewing ring means disposed on the base and the hose reel means is mounted for rotation on a second slewing ring means disposed on the pipeline reel means.

13. The system of claim 11 wherein the swivel piping means is mounted coaxially with the pipeline reel means and the hose reel means, the swivel piping means comprising a central section adapted to rotate with the pipeline reel means, an outer swivel section adapted to rotate independently, and conduit coupling means providing fluid communication between a conduit extending from the central section to a coil of flexible pipeline held in the pipeline reel means and conduit coupling means allowing fluid communication between the outer swivel section and a coil of tanker hose held in the hose reel means.

14. An offshore bulk liquid discharge system comprising a base, buoyancy tank means attached to the base for providing flotation for the system during transportation of the system to a mooring location and adapted for flooding to allow the system to be disposed on the sea floor, hose reel means for holding a coil of flexible tanker hose during transportation of the system to a mooring location and for unreeling the hose after the system is disposed on the sea floor, and swivel piping means for rotationally coupling a conduit adapted for connection to a pipeline with a coil of tanker hose held in the hose reel means.

15. The system of claim 14 further comprising a mooring buoy means releasably secured to the base, the buoy means being tethered to the base by a flexible securing means attached between the mooring buoy means and the base.

16. The system of claim 15 wherein the flexible securing means is an anchor chain and further comprising universal joint means connecting the anchor chain to the mooring buoy means and to the base.

17. The system of claim 14 wherein the hose reel means is mounted for rotation on a slewing ring means disposed on the base.

18. The system of claim 14 wherein the buoyancy tank means comprise a first buoyancy tank disposed at one end of the base, and a second buoyancy tank disposed at the other end of the base.

19. An offshore bulk liquid discharge system comprising, a base, buoyancy tank means attached to the base for providing flotation for the system during transportation of the system to a mooring location and adapted for flooding to allow the system to be disposed on the sea floor, wherein the buoyancy tank means comprises, a first buoyancy tank mounted at a first end of the base and having means for flooding the first tank, a second buoyancy tank mounted at a second end of the base and having means for flooding the second tank, a buoy cradle releasably secured at a first end of the base, a primary buoy releasably secured in the buoy cradle, tether means connected between the base and the primary buoy, first block and tackle means mounted at the buoy cradle and releasably connected to the first end of the base, first winch means secured to the buoy cradle and operably connected to the first block and tackle means for lowering the first end of the base toward the sea floor, an auxiliary buoy releasably secured at a second end of the base, second block and tackle means mounted on the auxiliary buoy and releasably connected to the second end of the base, and coupling means disposed on the base for connecting a pipeline provided between onshore storage facilities and the base and a tanker hose provided between a cargo vessel and the base, wherein the tanker hose comprises tanker hose sections releasably secured to the base of the system and wherein the tanker hose sections have coupling means on each end for connecting the sections end to end into a hose string and for connection of the hose string at one end to a conduit of the coupling means and at its other end to a discharge conduit of a vessel.

20. A method of deployment of an offshore bulk liquid discharge system between a shore location and a tanker comprising the steps of towing an offshore bulk discharge system to a deployment location, the system having
a base,
buoyancy tank means attached to the base,
pipeline reel means holding a coil of flexible pipeline,
hose reel means holding a coil of flexible tanker hose,
swivel piping means rotationally coupling the coil of flexible pipeline in the pipeline reel means with the coil of tanker hose in the hose reel means and a
mooring buoy releasably connected to the base, the buoy being tethered by a flexible securing means attached between the mooring buoy and the base,
flooding the buoyancy tank means and releasing the secured mooring buoy so that the base sinks and finally rests on the sea floor with the mooring buoy floating on the sea surface while still being tethered to the base of the system,
pulling the end of the coil of flexible pipeline to shore while the pipeline unreels from the pipeline reel means,
pulling the end of the flexible tanker hose to a tanker while the hose unreels from the hose reel means, and
attaching the tanker to the mooring buoy.

21. The method of claim 20 wherein the system buoyancy tank means has
a first buoyancy tank disposed at a first end of the base and
a second buoyancy tank disposed at a second end of the base, and
the steps of flooding the buoyancy tank means and releasing the secured mooring buoy comprise the steps of
releasing the mooring buoy from connection to the base,
flooding the first buoyancy tank and allowing the first end of the system to sink to the sea floor, and
flooding the second buoyancy tank and allowing the second end of the system to sink to the sea floor.

22. The method of claim 20 wherein the step of pulling a flexible pipeline from a submerged pipeline reel means to shore comprises the sub-steps of
attaching a tow line between the end of the flexible pipeline on the submerged pipeline reel means and a towing vessel,
pulling the flexible pipeline as close to shore as operationally possible with the towing vessel,
disconnecting the tow line from the end of the flexible pipeline,
attaching a winch line to the end of the flexible pipeline unspooled about a winch disposed onshore, and
spooling the winch line about the onshore winch until the flexible pipeline is landed onshore.

23. A method of deployment of a marine bulk liquid discharge system between a shore location and tanker comprising the steps of, towing an offshore bulk discharge system to a deployment location, the system having
a base,
a first buoyancy tank mounted at a first end of the base and having means for flooding the first tank,
a second buoyancy tank mounted at a second end of the base and having means for flooding the second tank,
pipeline reel means holding a coil of flexible pipeline,
hose reel means holding a coil of flexible tanker hose,
a buoy cradle releasably secured at the first end of the base,
a mooring buoy releasably secured in the buoy cradle,
tether means connected between the base and the mooring buoy,
first block and tackle means mounted on the buoy cradle and releasably connected to the first end of the base,
first winch means secured to the buoy cradle and operably connected to the first block and tackle means,
an auxiliary buoy releasably connected at a second end of the base,
second block and tackle means mounted on the auxiliary buoy and releasably connected to the second end of the base,
second winch means mounted on the auxiliary buoy and operably connected to the second block and tackle means, and
swivel piping means for rotationally coupling a coil of flexible pipeline held in the pipeline reel means with a coil of tanker hose held in the hose reel means,
disconnecting the buoy cradle from its secured connection at the first end of the base,
flooding the first buoyancy tank,
lowering the first end of the base into the sea by means of the first winch means and first block and tackle means until the base is inclined with respect to the surface of the sea,
disconnecting the auxiliary buoy from the second end of the base,
flooding the second buoyancy tank,
lowering the base while substantially in the inclined position into the sea by means of the first winch and block and tackle means and the second winch and block and tackle means until the first end of the base lands on the sea floor,
disconnecting the first block and tackle means from the first end of the base,
lowering the second end of the base by means of the second winch and block and tackle means until the base rests on the sea floor,
disconnecting the second block and tackle means from the second end of the base,
pulling the end of the coil of flexible pipeline to shore while the pipeline unreels from the pipeline reel means,
pulling the end of the flexible tanker hose to a tanker while the hose unreels from the hose reel means, and
attaching the tanker to the mooring buoy.

24. The method of claim 23 wherein the step of pulling a flexible pipeline from a submerged pipeline reel means to shore comprises the steps of attaching a tow line between the end of the flexible pipeline on the submerged pipeline reel means and a towing vessel, pulling the flexible pipeline as close to shore as operationally possible with the towing vessel, disconnecting the tow line from the end of the flexible pipeline, attaching a winch line to the end of the flexible pipeline unspooled about a winch disposed onshore, and spooling the winch line about the onshore winch until the flexible pipeline is landed onshore.

25. A method of deploying an offshore bulk liquid discharge system between a shore location and a tanker comprising the steps of providing an offshore bulk discharge system to a deployment location, the system having a base, buoyancy tank means attached to the base, hose reel means holding a coil of flexible tanker hose, swivel piping means rotationally coupling a conduit adapted for connection to a pipeline with the coil of tanker hose in the hose reel means, and a mooring buoy releasably connected to the base, the buoy being tethered by a flexible securing means attached between the mooring buoy and the base, flooding the buoyancy tank means and releasing the secured mooring buoy so that the base sinks and finally rests on the sea floor with the mooring buoy floating on the sea surface while still being tethered to the base of the system, providing a pipeline between the conduit coupled to the swivel piping means and an onshore storage facility, pulling the end of the flexible tanker hose to a tanker while the hose unreels from the hose reel means, and attaching the tanker to the mooring buoy.

26. The method of claim 25 wherein the system buoyancy tank means has a first buoyancy tank disposed at a first end of the base and a second buoyancy tank disposed at a second end of the base, and the steps of flooding the buoyancy tank means and releasing the secured mooring buoy comprise the steps of releasing the mooring buoy from connection to the base flooding the first buoyancy tank and allowing the first end of the system to sink to the sea floor, and flooding the second buoyancy tank and allowing the second end of the system to sink to the sea floor.

27. A method for deploying an offshore bulk liquid system in which the system has a base, a first buoyancy tank mounted at a first end of the base and having means for flooding the first tank, a second buoyancy tank mounted at a second end of the base and having means for flooding the second tank, a buoy cradle releasably secured at the first end of the base, a mooring buoy releasably secured in the buoy cradle, tether means connected between the base and the mooring buoy, first block and tackle means mounted on the buoy cradle and releasably connected to the first end of the base, first winch means secured to the buoy cradle and operably connected to the first block and tackle means, an auxiliary buoy releasably connected at a second end of the base, second block and tackle means mounted on the auxiliary buoy and releasably connected to the second end of the base, second winch means mounted on the auxiliary buoy and operably connected to the second block and tackle means, the method comprising the steps of providing the offshore bulk liquid system at an offshore deployment location proximal shore storage facilities, setting the base of the system on the sea bed at the deployment location, releasing a mooring buoy releasably secured to the system from the system to float on the sea surface while being tethered to the base of the system, and wherein the steps of setting the base of the system on the sea floor and releasing a mooring buoy from the system to float on the sea surface while being tethered to the base of the system comprise the substeps of, disconnecting the buoy cradle from its secured connection at the first end of the base, flooding the first buoyancy tank, lowering the first end of the base into the sea by means of the first winch means and first block and tackle means until the base is inclined with respect to the surface of the sea, disconnecting the auxiliary buoy from the second end of the base, flooding the second buoyancy tank, lowering the base while substantially in the inclined position into the sea by means of the first winch and block and tackle means and the second winch and block and tackle means until the first end of the base lands on the sea floor, disconnecting the first block and tackle means from the first end of the base, lowering the second end of the base by means of the second winch and block and tackle means until the base rests on the sea floor, and disconnecting the second block and tackle means from the second end of the base, attaching a tanker to the mooring buoy, connecting a pipeline to a coupling means disposed on the system, and connecting a tanker hose between the vessel and the coupling means.

28. A method of deployment of an offshore bulk liquid discharge system between a shore location and a tanker comprising the steps of, towing an offshore bulk discharge system to a position close to the shore location, a base, buoyancy tank means attached to the base, pipeline reel means carrying a coil of flexible pipeline, hose reel means carrying a coil of flexible tanker hose, swivel piping means rotationally coupling the coil of the flexible pipeline in the pipeline reel means with the coil of tanker hose in the hose reel means and a mooring buoy releasably connected to the base, the buoy being tethered by a flexible securing means attached between the mooring buoy and the base, attaching a winch line to the end of the flexible pipeline unspooled about a winch disposed onshore, spooling the winch line about the onshore winch until the flexible pipeline is landed onshore, towing said bulk discharge system to a deployment location while unspooling the flexible pipeline from said pipeline reel means, flooding the buoyancy tank means and releasing the secured mooring buoy so that the base sinks until it rests on the sea floor with the mooring buoy floating on the sea surface while still being tethered to the base of the system, pulling the end of the flexible tanker hose to a tanker while the hose unreels from the hose reel means, and attaching the tanker to the mooring buoy.

29. The method of claim 28 wherein the system buoyancy tank means has a first buoyancy tank disposed at a first end of the base, and a second buoyancy tank disposed at a second end of the base, and the steps of flooding the buoyancy tank means and releasing the secured mooring buoy comprise the steps of releasing the mooring buoy from connection to the base, flooding the first buoyancy tank and allowing the first end of the system to sink to the sea floor, and flooding the second buoyancy tank and allowing the second end of the system to sink to the sea floor.

30. An offshore bulk liquid discharge system comprising, a base, buoyancy tank means attached to the base for providing flotation for the system during transportation of the system to a mooring location and adapted for flooding to allow the system to be disposed on the sea floor, hose reel means carrying a coil of flexible tanker hose during transportation of the system to a mooring location and for unreeling the hose after the system is disposed on the sea floor, swivel piping means for rotationally coupling a conduit adapted for connection to a pipeline with a coil of tanker hose held in the hose reel means, an anchor chain having one end connected to the base, and secondary buoy means for holding said anchor chain in a substantially vertical position upon deployment of said system on the sea floor in relatively shallow water.

31. The system of claim 30 further comprising a primary buoy means releasably secured to the base, the buoy means being tethered to the base by a flexible securing means attached between the primary buoy means and the base, said primary buoy means adapted operably to moor a tanker in relatively deeper water than said secondary buoy means.

32. The system of claim 30 wherein the hose reel means is mounted for rotation on a slewing ring means disposed on the base.

33. The system of claim 30 wherein the buoyancy tank means comprise a first buoyancy tank disposed at one end of the base, and a second buoyancy tank disposed at the other end of the base.

34. A method of deploying an offshore bulk liquid discharge system between a shore location and a tanker comprising the steps of providing an offshore bulk discharge system to a deployment location, the system having a base, buoyancy tank means attached to the base, hose reel means carrying a coil of flexible tanker hose, swivel piping means rotationally coupling a conduit adapted for connection to a pipeline with the coil of tanker hose in the hose reel means, an anchor chain having one end connected to base, and secondary mooring buoy means connected at the other end of said anchor chain in a substantially vertical position upon deployment of said system on the sea floor in relatively shallow water, flooding the buoyancy tank means until the base sinks and rests on the sea floor with the secondary mooring buoy means floating on the sea surface while still being connected via said anchor chain to the base of the system, providing a pipeline between the conduit coupled to the swivel piping means and an onshore storage facility, pulling the end of the flexible tanker hose to a tanker while the hose unreels from the hose reel means, and attaching the tanker to the secondary mooring buoy means.

35. The method of claim 34 wherein the system additionally has a primary buoy means releasably secured to the base, the primary buoy means being tethered to the base by a flexible securing means attached between the primary buoy means and the base, said primary buoy means adapted operably to moore a tanker in relatively deeper water than said secondary mooring buoy means, the method further comprising the steps of disconnecting the primary buoy means from the system, and allowing the primary buoy means to float free from the system as the system is deployed on the sea floor.

36. The method of claim 34 wherein the system buoyancy tank means has a first buoyancy tank disposed at a first end of the base, and a second buoyancy tank disposed at a second end of the base, and the step of flooding the buoyancy tank means comprises the sub-steps of flooding the first buoyancy tank and allowing the first end of the system to sink to the sea floor, and flooding the second buoyancy tank and allowing the second end of the system to sink to the sea floor.

* * * * *